United States Patent
Schefe et al.

(10) Patent No.: US 9,740,576 B2
(45) Date of Patent: Aug. 22, 2017

(54) DATABASE RECOVERY AFTER SYSTEM COPY

(71) Applicants: Andre Schefe, Berlin (DE); Bernd Vorsprach, Berlin (DE); Henrik Hempelmann, Havelberg (DE); Martin E. Brunzema, Berlin (DE); Robin Wissbrock, Berlin (DE); Torsten Strahl, Kleinmachnow (DE)

(72) Inventors: Andre Schefe, Berlin (DE); Bernd Vorsprach, Berlin (DE); Henrik Hempelmann, Havelberg (DE); Martin E. Brunzema, Berlin (DE); Robin Wissbrock, Berlin (DE); Torsten Strahl, Kleinmachnow (DE)

(73) Assignee: SAP SE, Walldorf (DE)

( * ) Notice: Subject to any disclaimer, the term of this patent is extended or adjusted under 35 U.S.C. 154(b) by 358 days.

(21) Appl. No.: 14/553,400

(22) Filed: Nov. 25, 2014

(65) Prior Publication Data

US 2016/0147615 A1 May 26, 2016

(51) Int. Cl.
*G06F 17/30* (2006.01)
*G06F 11/14* (2006.01)
*G06F 15/16* (2006.01)

(52) U.S. Cl.
CPC ...... *G06F 11/1469* (2013.01); *G06F 11/1451* (2013.01); *G06F 2201/80* (2013.01)

(58) Field of Classification Search
None
See application file for complete search history.

(56) References Cited

U.S. PATENT DOCUMENTS

| 7,181,473 B1* | 2/2007 | Lacouture | G06F 17/30067 |
| 2009/0248759 A1* | 10/2009 | Okada | G06F 11/1456 |
| 2014/0074790 A1* | 3/2014 | Berman | G06F 17/3007 |
| | | | 707/649 |

* cited by examiner

*Primary Examiner* — Alex Gofman
(74) *Attorney, Agent, or Firm* — Buckley, Maschoff & Talwalkar LLC

(57) ABSTRACT

A system includes reception, at a target database system, of a request to recover a backup created by a source database system into the target database system, where the request comprises a system identifier of the source database system, determination of a backup tool configuration file associated with the source database system based on the system identifier of the source database system, request of a recovery of the backup into the target database system using the backup tool configuration file, copying of a backup catalog of the source database system into a storage location associated with the target database system, and appending of a system change marker to the copied backup catalog, wherein the system change marker comprises the system identifier of the source database system.

11 Claims, 11 Drawing Sheets

300

Recovery of System GIT

Specify Recovery Type
Select a Recovery Type

● Recover the Database to its most recent state  ← 310
○ Recover the Database to the following point in time Date: [ ]   Time: [ ]

Select Time Zone: [                    ]

○ Recover the Database to a specific data backup or storage snapshot

320
[ Next ]  [ Cancel ]

Recovery of System GIT

Locate Log Backups
Specify location(s) of log backup files to be used to recover the database Locations: [                    ] [ Add ]
          [ /usr/sap/GIT/HDB01/backup/log ] [ Remove All ]
                                            [ Remove ]

Source System: [ H13 ]
                  ↖410

420
[ Next ] [ Cancel ]

| Backup Id | Type | Name | Timestamp | Location | Size |
|---|---|---|---|---|---|
| ~~~ | Data | ~~~~~~~~~ | ~~~~~~~~~~~ | ~~~~~~~~ | ~~~ |
|  | SysChg | H13 |  |  | ~~~ |
| ~~~ | Log | ~~~~~~~~~ | ~~~~~~~~~~~ | ~~~~~~~~ | ~~~ |
| ~~~ | Log | ~~~~~~~~~ | ~~~~~~~~~~~ | ~~~~~~~~ | ~~~ |
| ~~~ | Log | ~~~~~~~~~ | ~~~~~~~~~~~ | ~~~~~~~~ | ~~~ |

| Backup Id | Type | Name | Timestamp | Location | Size |
|---|---|---|---|---|---|
| ~~~ | Data | ~~~~~~~ | ~~~~~~~~~ | ~~~~~~~~ | ~~~ |
|  | SysChg | H13 |  |  | ~~~ |
| ~~~ | Log | ~~~~~~~ | ~~~~~~~~~ | ~~~~~~~~ | ~~~ |
| ~~~ | Log | ~~~~~~~ | ~~~~~~~~~ | ~~~~~~~~ | ~~~ |
| ~~~ | Log | ~~~~~~~ | ~~~~~~~~~ | ~~~~~~~~ | ~~~ |
| ~~~ | Log | ~~~~~~~ | ~~~~~~~~~ | ~~~~~~~~ | ~~~ |
|  | SysChg | GIT |  |  |  |
| ~~~ | Log | ~~~~~~~ | ~~~~~~~~~ | ~~~~~~~~ | ~~~ |
| ~~~ | Log | ~~~~~~~ | ~~~~~~~~~ | ~~~~~~~~ | ~~~ |

DATABASE RECOVERY AFTER SYSTEM COPY

BACKGROUND

During operation, modern database systems generate backup files which may be used to recover from database crashes. Backup and recovery functions are often performed by dedicated backup tools, which may be provided by third party vendors. A backup tool abstracts the storage which holds the backup files, and may implement its own lifecycle management and access control for the backup files.

Commonly-assigned, co-pending U.S. patent application Ser. No. 14/553,026 describes systems for recovering a backup of one database system into a second database system. Subsequent operation of the second database system causes the second database system to generate its own backups. Systems are desired to recover the second database system based on the backups used during the original recovery and on backups written by the second database system after the original recovery.

BRIEF DESCRIPTION OF THE DRAWINGS

FIG. 3 is an outward view of a user interface for initiating recovery of a database system according to some embodiments.

FIG. 4 is an outward view of a user interface for initiating recovery of a database system according to some embodiments.

FIG. 8 is a tabular representation of a portion of a database catalog according to some embodiments.

FIG. 9 is a tabular representation of a portion of a database catalog according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
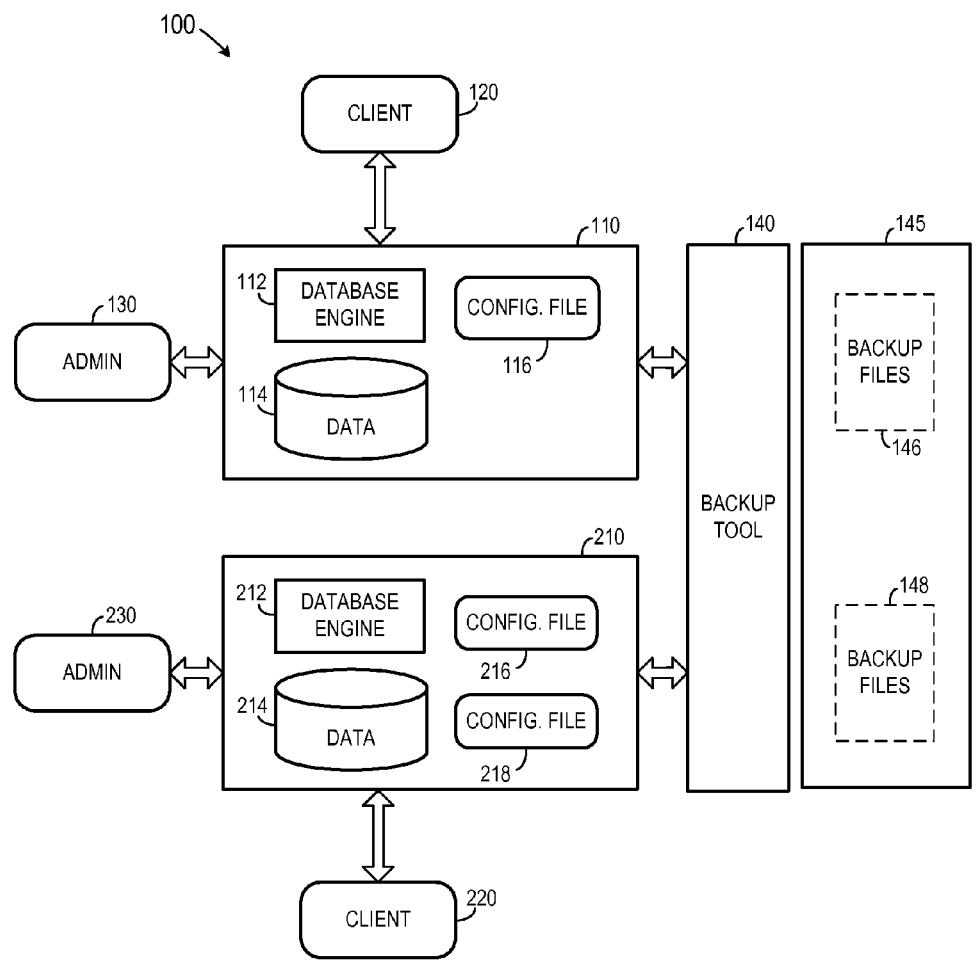
FIG. 1 is a block diagram of a system according to some embodiments.

FIG. 1 is a block diagram of system 100 according to some embodiments. System 100 includes database 110, client 120, and administrator 130 of a first database system, and database 210, client 220 and administrator 230 of a second database system. Generally, each client requests and receives data from its respective database system. For example, database engine 112 of database system 110 manages data 114, and provides data of data 114 to client 130 in response to requests received therefrom.

Each of database systems 110 and 210 may comprise any query-responsive data source or sources that are or become known, including but not limited to a structured-query language (SQL) relational database management system. Data 114 and/or 214 may comprise a relational database, a multi-dimensional database, an eXtendable Markup Language (XML) document, or any other data storage system storing structured and/or unstructured data. Data 114 and/or 214 may be distributed among several relational databases, multi-dimensional databases, and/or other data sources. Embodiments are not limited to any number or types of data sources.

Each of database systems 110 and 210 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database. In some embodiments, data 114 and/or 214 comprises one or more of conventional tabular data, row-based data stored in row format, column-based data stored in columnar format, and object-based data. Each of database systems 110 and 210 may also or alternatively support multi-tenancy by providing multiple logical database systems which are programmatically isolated from one another. Moreover, data 114 and/or 214 may be indexed and/or selectively replicated in an index to allow fast searching and retrieval thereof.

Administrators 130 and 230 provide management of database systems 110 and 210, respectively. For example, administrator 230 may define the structure of tables within data 214, may configure hosts within database 210, may schedule backup operations, and may instruct database engine 212 to recover data 214 based on data backups and, if desired, log backups.

Each of administrator and client of system 100 may comprise one or more devices executing program code of a software application for presenting user interfaces to allow interaction with its respective database system. Presentation of a user interface may comprise any degree or type of rendering. For example, administrator 130 may execute a Web Browser to receive a Web page (e.g., in HTML format) from database system 110, and may render and present the Web page according to known protocols. Each administrator or client may also or alternatively present user interfaces by executing a standalone executable file (e.g., an .exe file) or code (e.g., a JAVA applet) within a virtual machine.

System 100 also includes backup tool 140 and backup file storage 145. Backup tool 140 may create and store backups in file storage 145 in response to commands received from database system 110 and database system 210. The backups may comprise data backups, which include the data of a database system, and/or log backups, which describe changes made to the data during an associated time period.

Configuration file 116 of database system 110 includes backup authorization data and backup storage location information. Database engine 112 provides this data and information to backup tool 140 along with backup-related commands. Backups 146 are stored in the location specified by configuration file 116, and include data and log backups associated with database system 110. Similarly, and backups 148 are stored in the location specified by configuration file 216, and include data and log backups associated with database system 210. Moreover, each backup is stored in association with a system identifier of its source database system. Database system 110 and database system 210 are assigned different system identifiers.

The handover of a backup to the backup tool 140 is done according to named filepaths, or pipes. The names of these pipes are specific to the database system which instructs backup tool 140 to write the backup, and becomes a property of the backup in storage 145. According to some embodiments, a database engine must provide the name of the pipe used to write a backup and an identifier of the database system in order to request the backup for a recovery from backup tool 140.

In addition to configuration file 216 described above, database system 210 also includes configuration file 218. Configuration file 218 includes backup authorization data and backup storage location information associated with database system 110. Configuration file may be a copy of configuration file 116. Configuration file 218 therefore provides database engine 212 with read access to backups 146 of database system 110. Usage of this access will be described below.

Writing a full data backup typically consumes a significant amount of time and is therefore not performed often. Rather, modifications made to a database between data backups are recorded in log backups. Backup tool 140 records information about all data and log backups written by the database system in a backup catalog. If it is desired to recover the database to a specified point in time, a log backup matching the specified point in time is determined from the backup catalog. All previous log backups after a last data backup are also determined. During recovery, the database contents are replaced by the contents of the data backup, followed by execution of all modifications recorded in the determined log backups.

Figure 2:
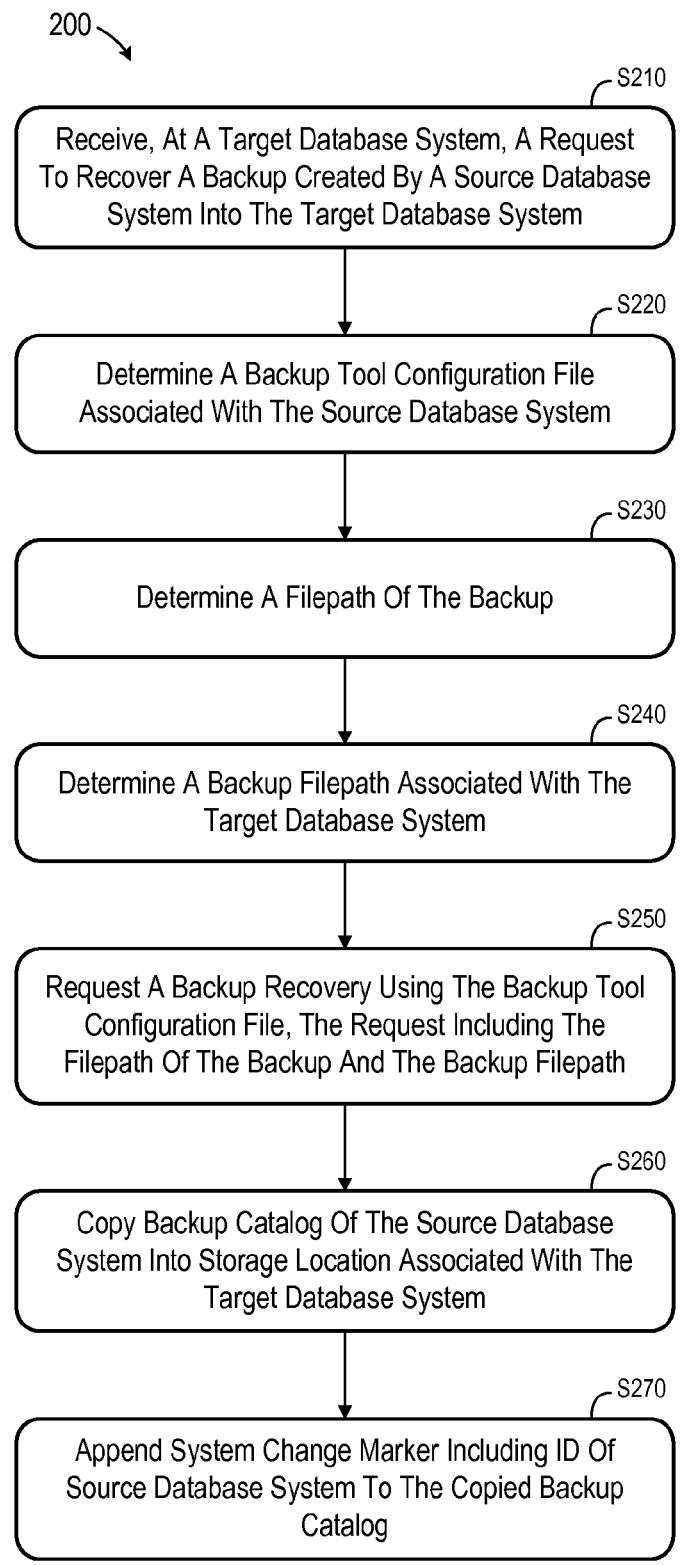
FIG. 2 is a flow diagram of a process according to some embodiments.

FIG. 2 comprises a flow diagram of process 200 according to some embodiments. In some embodiments, various hardware elements of database system 210 execute program code of database engine 220 to perform process 200. Process 200 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Generally, process 200 provides recovery of a backup of a source database system into a target database system. During the recovery, the target database system uses the system identifier of the source database system to determine the appropriate configuration file and the appropriate pipe names to provide to the backup tool in order to access the backups of the source database system.

Initially, at S210, a request is received at a target database system. The request is a request to recover a backup created by a source database system into the target database system. According to the present example, the request is submitted to target database system 210 by an operator operating administrator 230, and is a request to recover a backup created by source database system 110 (and stored among backups 146) into target database system 210.

At the time of the request, the system identifier of source database system 110 is not known by target database system 210. Accordingly, this information is provided to target database system 210 with the request. In one example of S210, administrator 230 invokes a user interface for managing backup operations. As described above, such a user interface may be generated and displayed by an application executing on administrator 230, may comprise a Web page or other interface provided to administrator 230 by database engine 212 and displayed thereby, or may be displayed by any other means.

FIG. 3 is an outward view of user interface 300 according to some embodiments. Embodiments may utilize any other user interface or system for receiving the request at S210. An operator may select any recovery option shown in area 310. In the present example, the operator has selected "Recover the database to its most recent state". After selection of Next control 320, user interface 400 of FIG. 4 is presented. The operator inputs the system identifier (e.g., "H13") of the source database system into field 410 of user interface 400 and selects Next control 420.

In response, at S220, a backup tool configuration file associated with the source database system is determined. As described above, the file includes configuration information which is needed to access a backup of the source database system. The name of the file is stored as a database parameter of system 210.

In order to support configuration file names which are specific for a system identifier, the stored filename supports a placeholder such as "$(SID)". During typical operation, target database system 210 would substitute its own system identifier for the placeholder in order to locate its configuration file and initiate backups or request recovery from backup tool 140. However, at S220, the appropriate configuration file is determined by expanding the filename with the system identifier of the source database system.

Figure 5:
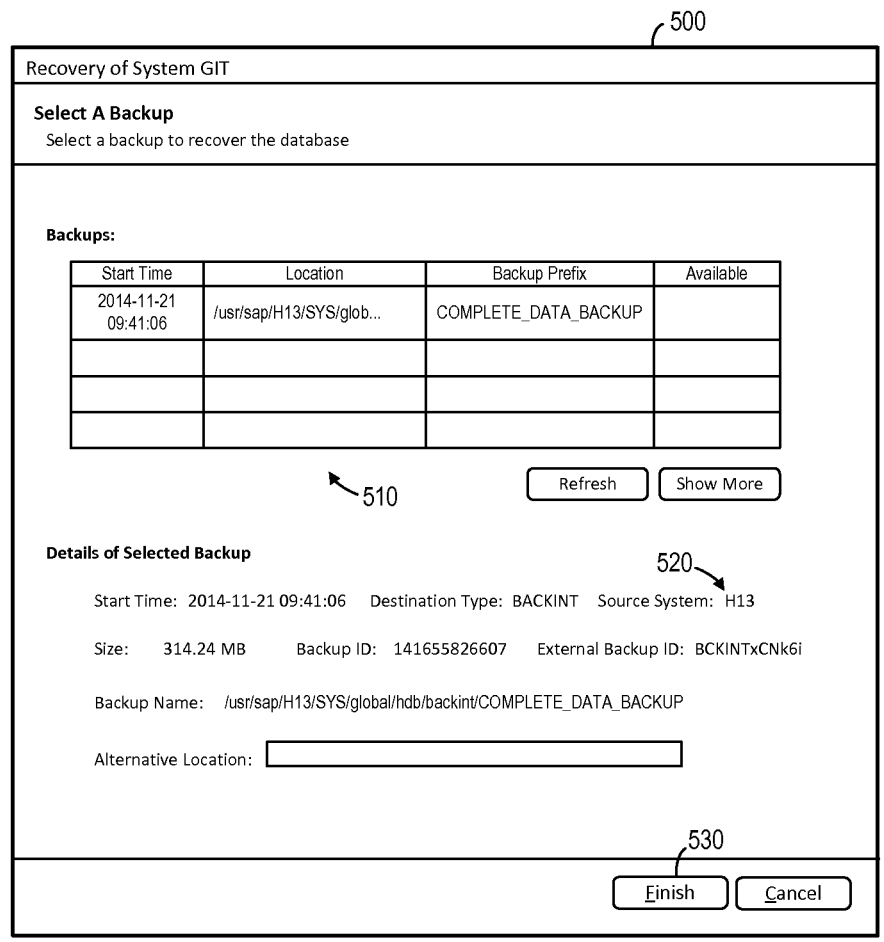
FIG. 5 is an outward view of a user interface for initiating recovery of a database system according to some embodiments.

User interface 500 of FIG. 5 is displayed to indicate backups specified in a backup catalog associated with source database system 110. The backup catalog is read from backup tool 140 using the appropriate configuration file determined at S220. List 510 includes one row for each backup job represented in the backup catalog of the source database system identified by identifier 520. These backup jobs may consist of log backups or data backups.

The operator selects one of the displayed backups from this backup catalog and selects Finish control 530 to initiate the recovery. Database engine 212 computes all backups required for recovery to the selected backup (i.e., if the selected backup is a log backup, otherwise only the selected (data) backup is required).

A filepath (i.e., pipe) of the backup within storage 145 is then determined at S230. The names of the pipes used for backup and recovery may be database system-specific and computed by rule. The name may be "/usr/sap/<SID>/SYS/global/hdb/backint/<backupname>", where the placeholder "<SID>" is the system identifier of the source database system (e.g., "H13"). Similarly, at S240, a backup filepath associated with the target database system is determined, by substituting the placeholder for the system identifier of the target database system.

A backup recovery is requested at S250 based on the system identifier of the source database system and the parameters determined at S220, S230 and S240. According to the present example, target database system 210 requests a recovery from backup tool 140 using the configuration file determined at S220, and the request includes the system identifier of the source database system, the pipe name including the substituted system identifier of the source database system and the target pipe name including the substituted the system identifier of the target database system. In response to the request, backup tool 140 uses the original pipe name to identify the required backups among backups 146 of storage 145 and uses the target pipe name to send the backup into this pipe. Database system 210 expects and receives the backup in the target pipe and conducts a recovery using its standard processes.

Next, at S260, the backup catalog of the source database system is copied into a storage location associated with the target database system. According to some embodiments, the storage location comprises backup files 148. As mentioned above, target database system 210 may access the backup catalog of source database system 110 via backup tool 140 using configuration file 218.

A system change marker is appended to the copied backup catalog at S270. The system change marker includes the system identifier of the source database system.

Figure 6:
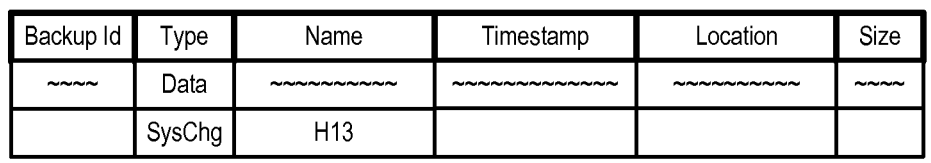
FIG. 6 is a tabular representation of a portion of a database catalog according to some embodiments.

FIG. 6 is a tabular representation of a portion of backup catalog 600 after S270 according to some embodiments. A first row of backup catalog 600 specifies a data backup associated with source database system 110 which was used to recover target database system 210. If the recovery of system 210 also included recovery of one or more log backups of source database system 110, those log backups would be represented as individual rows below the first row of backup catalog 600, in ascending order of their respective timestamps. Embodiments are not limited to the structure and contents of backup catalog 600 as shown in FIG. 6.

FIG. 6 also shows a system change marker appended as a row to catalog 600 according to some embodiments of S270. The system change marker includes an identifier of source database system 110.

Figure 7A:
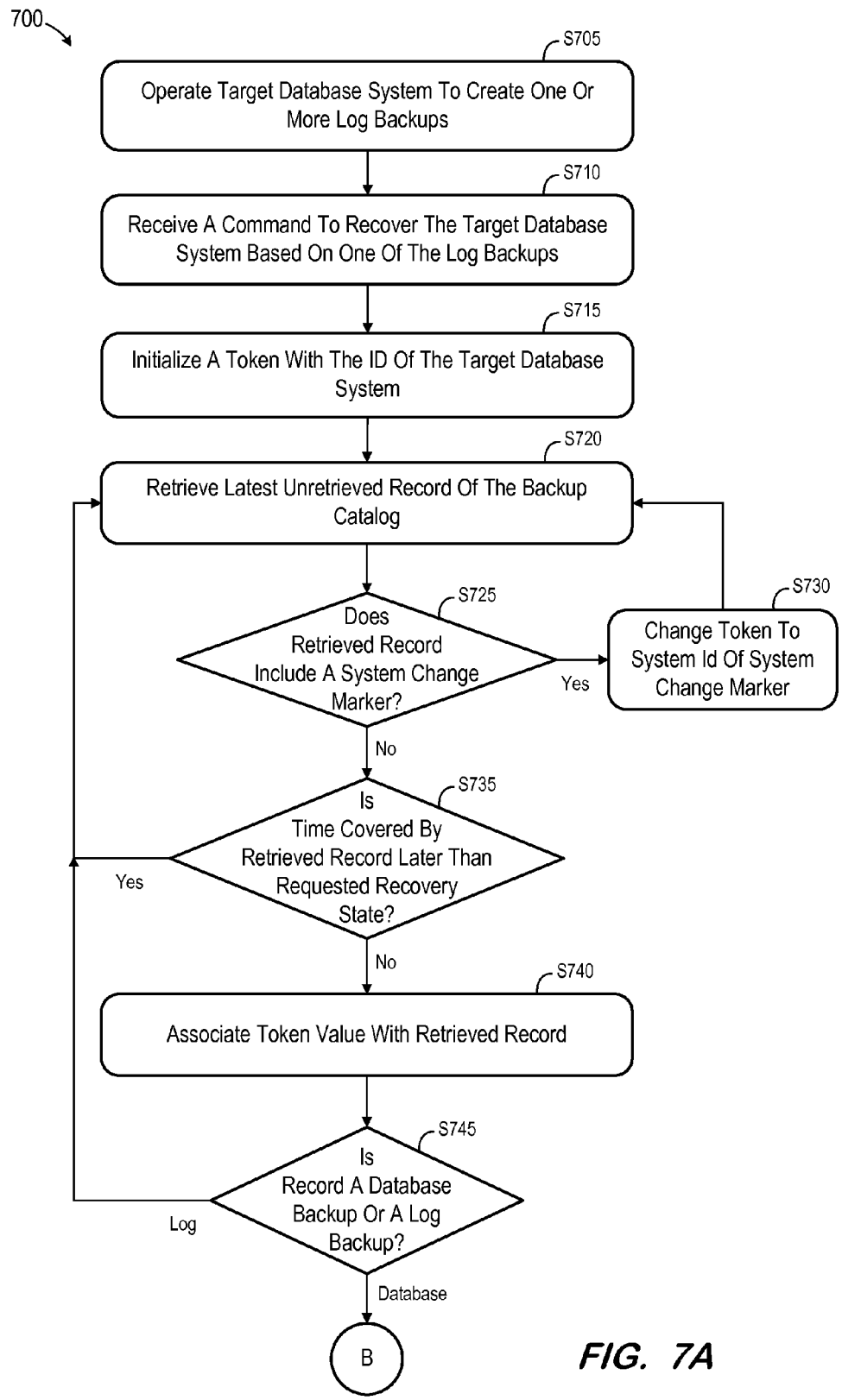
FIGS. 7A and 7B comprise a flow diagram of a process according to some embodiments.
Figure 7B:
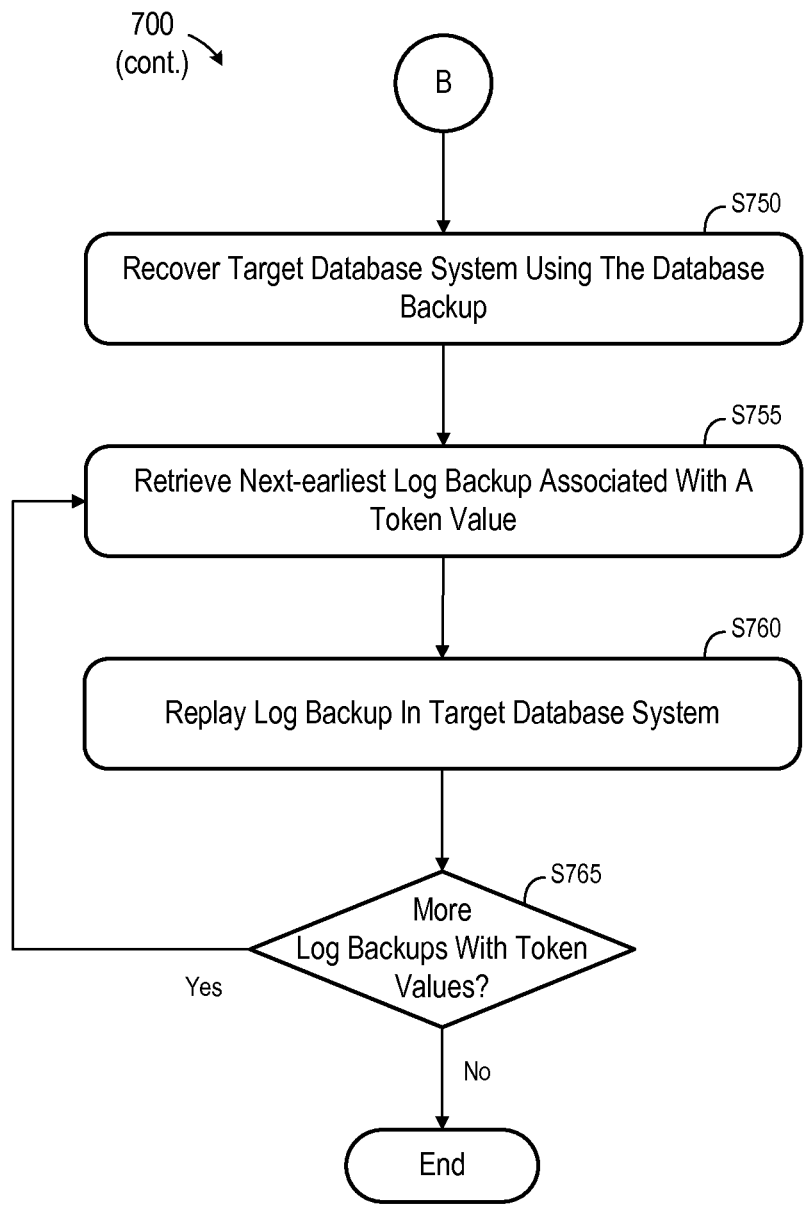

Process 700 of FIG. 7 may be performed after the system copy operation of process 200. Initially, at S705, the target database system is operated to create one or more log backups. As described above, client 230 may issue requests and/or commands which modify data 214. At predetermined intervals, or in response to certain parameters (e.g., number of modifications, etc.), database engine 212 instructs backup tool 140 to create a log backup. The instruction utilizes configuration file 216, and therefore the log backup is associated with a system identifier of database system 210 and is stored among backup files 148.

Flow may cycle at S705 for any amount of time, during which one or more additional log backups are created. Upon creation of each log backup, an entry of the log backup is created in the backup catalog of the target database system. FIG. 8 illustrates backup catalog 600 of the present example, in which three log backups have been created after the original system recovery based on the backup of source database system 110.

Next, at S710, a command is received to recover the target database system based on one of the log backups. The request may specify a particular log backup or a particular time which is encompassed by one of the log backups. Database engine 212 may receive the command from administrator 240, via user interfaces such as those illustrated in FIGS. 3-5. In response to the command, a token is initialized with the system identifier of the target database system at S715. The significance of the token will be evident from the description below.

A latest time-stamped record of the backup catalog is retrieved at S720. At S725, it is determined whether the retrieved record includes a system change marker. If not, such as in the case of the last-added record of backup catalog 600 of FIG. 8, flow proceeds to S735. At S735, it is determined whether the time covered by the retrieved record is later than the time of the requested recovery state. If so, the record is ignored and flow returns to S720. For purposes of the present example, it will be assumed that the last record of catalog 600 is retrieved at S720 and it is determined at S735 that the time covered by the record is later than the time of the requested recovery state.

A latest (i.e., temporally) unretrieved record of the backup catalog is retrieved at S720. Assuming that the fourth record of catalog 600 is now retrieved at S720, flow proceeds through S725 and on to S735. It will be assumed that the time period covered by this record is relevant to the requested recovery state and therefore flow proceeds to S740.

At S740, the token value is associated with the retrieved record. In the present example, the token value is currently equal to the system identifier of the target database system. It is then determined at S745 whether the retrieved record represents a database backup or a log backup. Since the retrieved record represents a log backup, flow returns to S720.

Flow continues as described above to collect the third record of catalog 600 and associate the record, via the token, with the system identifier of the target database system. The third record also represents a log backup so flow returns to S720, upon which the second record of catalog 600 is retrieved. Since this record includes a system change marker, the token value is changed to the system identifier specified by the system change marker at S730. In the present case, the system identifier specified by the system change marker is the system identifier of source database system 110.

A next-latest unretrieved record of the backup catalog is retrieved at S720. Continuing the present example, this record is the first record of catalog 600. The current token value (i.e., the system identifier of source database system 110) is associated with the record at S740 and, because the record represents a database backup, flow proceeds from S745 to S750.

At S750, the target database system is recovered using the database backup indicated by the last-retrieved record. The recovery may proceed as described above with respect to S250, where the system identifier associated with the database backup at S740 is used to identify a backup tool configuration file for the recovery request and is also used to determine the appropriate pipe names to include with the recovery request.

Next, in order to ensure that the target database system reflects data modifications made during S705 after the prior recovery, flow proceeds to S755 to retrieve a next-earliest log backup associated with a token value. S755 refers to those backups which were previously associated with a token value at S740. With respect to the present example, the log backup indicated by the third row of catalog 600 is initially retrieved at S755. As mentioned above, the token value associated with this log backup is the system identifier of the target database system.

The log backup is retrieved from backup tool 140 using a configuration file determined based on the associated token value (i.e., the system identifier of database system 210), and by passing pipe names which are also determined based on the associated token value. Determination of the configuration file and the pipe names based on the associated token value may proceed as described above.

The retrieved log backup is replayed in the target database system at S760. Replaying the log backup results in modification of the state of the target database system to a state which existed at the end of the time period to which the log backup corresponds. At S765, it is then determined whether other log backups were collected and associated with token values during S740. In the present example, two additional log backups were associated with token values during S740.

Accordingly, flow cycles twice more through S755, S760 and S755 to replay these two log backups, and then terminates Process 700 is compatible a backup catalog including any number of system change markers. For example, backup catalog 900 of FIG. 9 includes two system change markers. The second record of backup catalog 900 indicates a first system copy operation as described above with respect to process 200. Next, log backups were appended to backup catalog 900 due to operation of the target database system of the first system copy operation, as described with respect to S705.

Then, a second system copy operation was executed according to process 200, with the original target database system (i.e., having system identifier "GIT") being the source of the second system copy operation. Accordingly, backup catalog 900 is the backup catalog of the target database system of the second system copy operation (i.e., referred to herein as the "second" target database system. As shown, the second target database system has operated since the second system copy operation so as to generate two of its own log backups as described with respect to S705.

During recovery of the second target database system (to its latest state, for example) according to process 700, the latest two log backups are collected and associated with a token value equal to the system identifier of the second target database system. Next, due to the system change marker, the token value is changed to "GIT", which is the identifier of the first target database system. The next four log backups are collected and associated with this token value. The token value is then changed to "H13" due to the subsequently-retrieved system change marker. Lastly, the record of the data backup is retrieved and associated with the current token value, H13.

The data backup is then recovered by the second target database system using the associated token value (i.e., H13) as described with respect to S750, and each log backup associated with the token value SYS is retrieved replayed as described with respect to S755 and S760. Finally, the last two log backups, which are associated with the system identifier of the second target database system, are retrieved and replayed as described with respect to S755 and S760.

Figure 10:
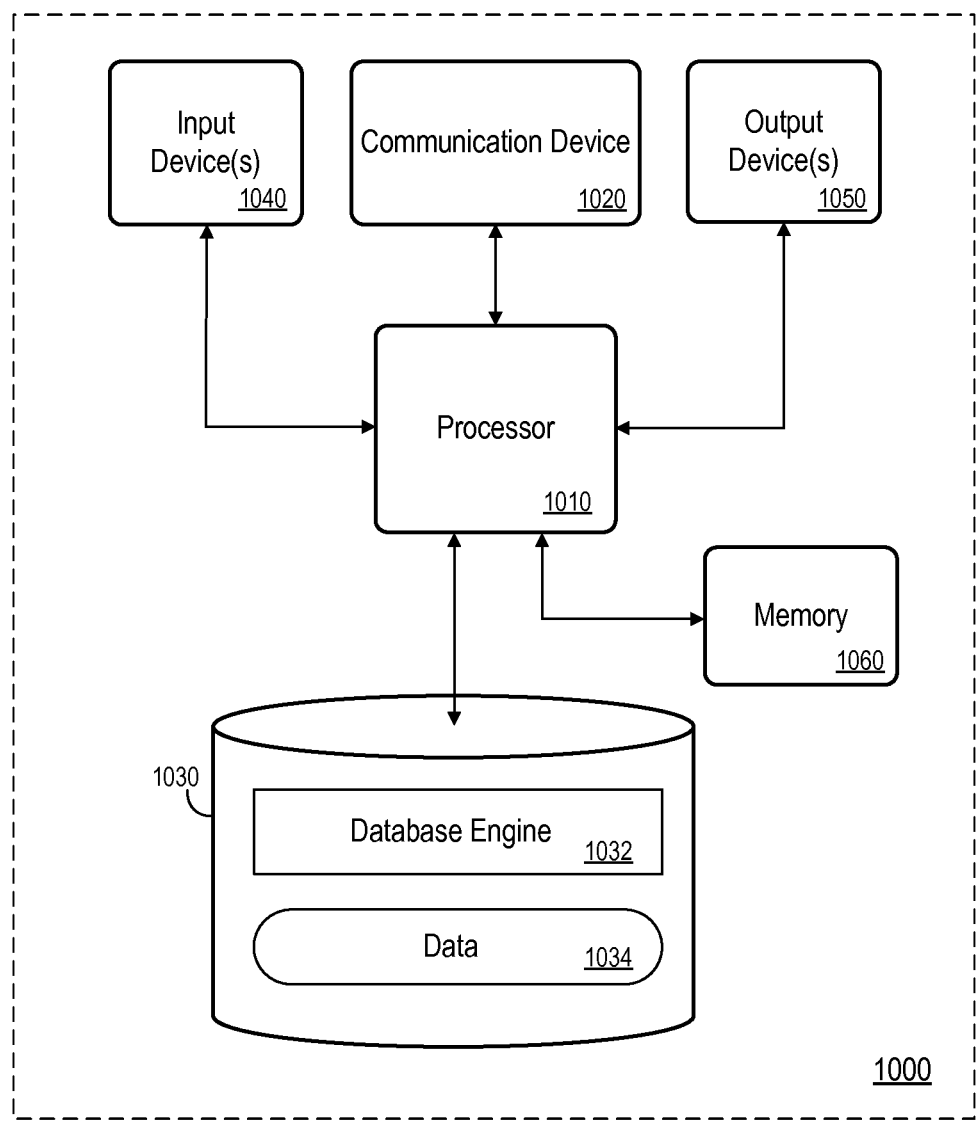
FIG. 10 is a block diagram of an apparatus according to some embodiments.

FIG. 10 is a block diagram of system 1000 according to some embodiments. System 1000 may comprise a general-purpose computing system and may execute program code to perform any of the processes described herein. System 1000 may comprise an implementation of database system 210 according to some embodiments. System 1000 may include other unshown elements according to some embodiments.

System 1000 includes processor 1010 operatively coupled to communication device 1020, data storage device 1030, one or more input devices 1040, one or more output devices 1050 and memory 1060. Communication device 1020 may facilitate communication with external devices, such as a reporting client, or a data storage device. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to enter information into apparatus 1000. Output device(s) 1050 may comprise, for example, a display (e.g., a display screen) a speaker, and/or a printer.

Data storage device 1030 may comprise any appropriate persistent storage device, including combinations of magnetic storage devices (e.g., magnetic tape, hard disk drives and flash memory), optical storage devices, Read Only Memory (ROM) devices, etc., while memory 1060 may comprise Random Access Memory (RAM).

Database engine 1032 may comprise program code executed by processor 1010 to cause apparatus 1000 to perform any one or more of the processes described herein. Embodiments are not limited to execution of these processes by a single apparatus. Data 1034 may include data 214 as described above. As also described above, data 214 may be implemented using volatile memory such as memory 1060. Data storage device 1030 may also store data and other program code for providing additional functionality and/or which are necessary for operation of system 1000, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A computing system comprising:
   a memory storing processor-executable program code; and
   a processor to execute the processor-executable program code in order to cause the computing system to:
   receive, at a target database system, a request to recover a backup created by a source database system into the target database system, where the request comprises a system identifier of the source database system, and
   determine a backup tool configuration file associated with the source database system based on the system identifier of the source database system;
   request a recovery of the backup into the target database system using the backup tool configuration file;
   copy a backup catalog of the source database system into a storage location associated with the target database system;
   append a system change marker to the copied backup catalog;
   operate the target database system to create one or more log backups;
   receive a command to recover the target database system based on one of the one or more log backups;

initialize a token with a value of a system identifier of the target database system;
identify a record of the backup catalog associated with the one of the log backups;
associate the record with the value of the token;
determine whether an earlier record of the backup catalog includes a system change marker; and
if the earlier record of the backup catalog includes a system change marker, replace the value of the token with a value of a system identifier specified by the system change marker, and
if the earlier record of the backup catalog does not include a system change marker, associate the earlier record with the value of the token,
wherein the system change marker comprises the system identifier of the source database system.

2. A computing system according to claim 1, wherein if the earlier record of the backup catalog includes a system change marker, the processor is further to execute the processor-executable program code in order to cause the computing system to:
identify a second earlier record of the backup catalog; and
associate the second earlier record with the replaced value of the token.

3. A computing system according to claim 2, wherein the second earlier record is associated with a data backup, and wherein the processor is further to execute the processor-executable program code in order to cause the computing system to:
recover the data backup into the target database system using the replaced value of the token; and
replay the backup associated with the earlier record using the token value associated with the earlier record.

4. A computing system according to claim 2, wherein the second earlier record is associated with a log backup, and wherein the processor is further to execute the processor-executable program code in order to cause the computing system to:
identify a third earlier record of the backup catalog associated with a data backup;
associate the third earlier record with the replaced value of the token;
recover the data backup into the target database system using the replaced value of the token;
replay the log backup associated with the second earlier record using the replaced value of the token; and
replay the backup associated with the earlier record using the token value associated with the earlier record.

5. A non-transitory computer-readable medium storing program code, the program code executable by a processor of a computing system to cause the computing system to:
receive, at a target database system, a request to recover a backup created by a source database system into the target database system, where the request comprises a system identifier of the source database system, and
determine a backup tool configuration file associated with the source database system based on the system identifier of the source database system;
request a recovery of the backup into the target database system using the backup tool configuration file;
copy a backup catalog of the source database system into a storage location associated with the target database system;
append a system change marker to the copied backup catalog;
operate the target database system to create one or more log backups;
receive a command to recover the target database system based on one of the one or more log backups;
initialize a token with a value of a system identifier of the target database system;
identify a record of the backup catalog associated with the one of the log backups;
associate the record with the value of the token;
determine whether an earlier record of the backup catalog includes a system change marker; and
if the earlier record of the backup catalog includes a system change marker, replace the value of the token with a value of a system identifier specified by the system change marker, and
if the earlier record of the backup catalog does not include a system change marker, associate the earlier record with the value of the token, wherein the system change marker comprises the system identifier of the source database system and wherein if the earlier record of the backup catalog includes a system change marker, the program code is further executable by a processor of a computing system to cause the computing system to identify a second earlier record of the backup catalog and associate the second earlier record with the replaced value of the token.

6. A non-transitory computer-readable medium according to claim 5, wherein the second earlier record is associated with a data backup, and wherein the program code is further executable by a processor of a computing system to cause the computing system to:
recover the data backup into the target database system using the replaced value of the token; and
replay the backup associated with the earlier record using the token value associated with the earlier record.

7. A non-transitory computer-readable medium according to claim 5, wherein the second earlier record is associated with a log backup, and wherein the program code is further executable by a processor of a computing system to cause the computing system to:
identify a third earlier record of the backup catalog associated with a data backup;
associate the third earlier record with the replaced value of the token;
recover the data backup into the target database system using the replaced value of the token;
replay the log backup associated with the second earlier record using the replaced value of the token; and
replay the backup associated with the earlier record using the token value associated with the earlier record.

8. A computer-implemented method comprising:
receiving, at a target database system, a request to recover a backup created by a source database system into the target database system, where the request comprises a system identifier of the source database system, and
determining a backup tool configuration file associated with the source database system based on the system identifier of the source database system;
requesting a recovery of the backup into the target database system using the backup tool configuration file;
copying a backup catalog of the source database system into a storage location associated with the target database system;
appending a system change marker to the copied backup catalog;
operating the target database system to create one or more log backups;
receiving a command to recover the target database system based on one of the one or more log backups;

initializing a token with a value of a system identifier of the target database system;

identifying a record of the backup catalog associated with the one of the log backups;

associating the record with the value of the token;

determining whether an earlier record of the backup catalog includes a system change marker; and if the earlier record of the backup catalog includes a system change marker, replacing the value of the token with a value of a system identifier specified by the system change marker, and if the earlier record of the backup catalog does not include a system change marker, associating the earlier record with the value of the token, wherein the system change marker comprises the system identifier of the source database system.

9. A computer-implemented method according to claim 8, wherein if the earlier record of the backup catalog includes a system change marker, the method further comprises:

identifying a second earlier record of the backup catalog; and associating the second earlier record with the replaced value of the token.

10. A computer-implemented method according to claim 9, wherein the second earlier record is associated with a data backup, and further comprising:

recovering the data backup into the target database system using the replaced value of the token; and replaying the backup associated with the earlier record using the token value associated with the earlier record.

11. A computer-implemented method according to claim 9, wherein the second earlier record is associated with a log backup, and further comprising:

identifying a third earlier record of the backup catalog associated with a data backup;

associating the third earlier record with the replaced value of the token;

recovering the data backup into the target database system using the replaced value of the token;

replaying the log backup associated with the second earlier record using the replaced value of the token; and replaying the backup associated with the earlier record using the token value associated with the earlier record.

\* \* \* \* \*